May 13, 1930.  H. P. DORN  1,758,191

ELECTRIC PHONOGRAPH MOTOR

Filed March 31, 1926    2 Sheets-Sheet 1

INVENTOR
Harry P. Dorn
By Ray H. Weber
ATTORNEY

May 13, 1930.     H. P. DORN     1,758,191
ELECTRIC PHONOGRAPH MOTOR
Filed March 31, 1926    2 Sheets-Sheet 2

INVENTOR.
Harry P. Dorn
By Ray P. Tyler ATTORNEY.

Patented May 13, 1930

1,758,191

UNITED STATES PATENT OFFICE

HARRY P. DORN, OF CLEVELAND, OHIO, ASSIGNOR TO RAY S. GEHR, OF SHAKER HEIGHTS, OHIO

ELECTRIC PHONOGRAPH MOTOR

Application filed March 31, 1926. Serial No. 98,904.

This invention relates to electric motors especially adapted to the rotation of the record tables or supports of phonographs or talking machines.

The principal objects of the invention are comprehended in the provision at a minimum cost of a motor that is simple in construction, dependable in operation and adapted, when directly connected to the record table or support of a phonograph to operate quietly on alternating currents of all commercial frequencies to drive the record table or support at a highly uniform, suitably slow speed and with ample torque notwithstanding wide variations of the voltage of the current supply.

Further objects, more or less incidental or ancillary to the foregoing will appear in the following description in connection with the accompanying drawings which show a preferred embodiment of the invention.

In the drawings, Fig. 1 is a plan view of the motor.

Figure 3:
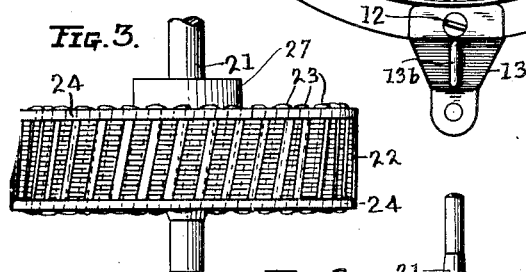
Fig. 3 is a side elevation of the rotor of the motor, the upper part of the rotor shaft being broken away.
Figure 6:
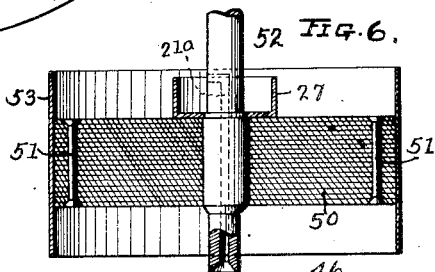
Fig. 6 is an axial sectional view through a modified form of rotor, the upper part of the rotor shaft being broken away.
Figure 2:
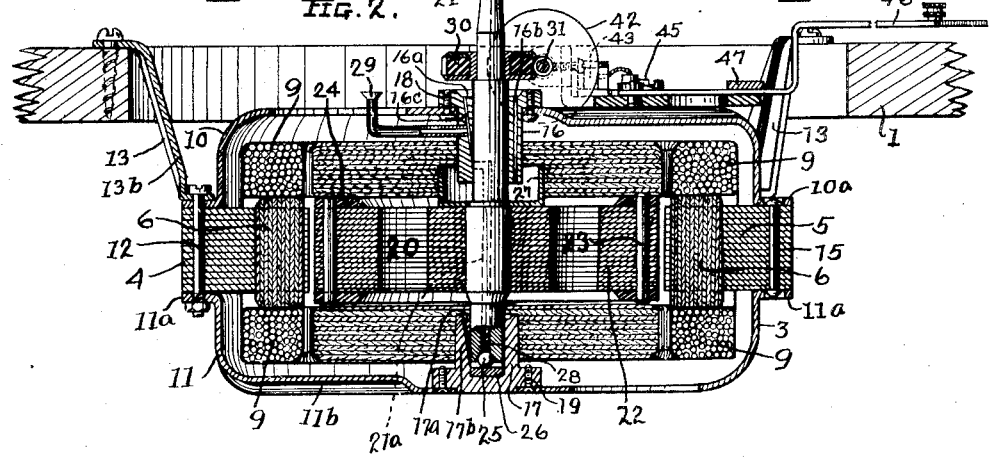
Fig. 2 is a vertical section on the line 2—2, Fig. 1.
Figure 5:
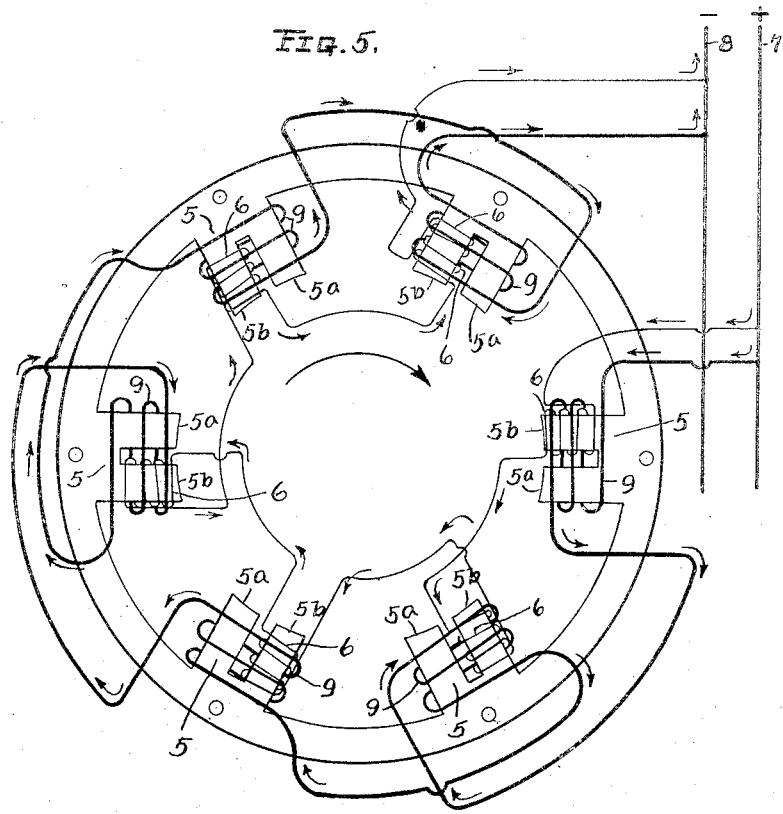
Fig. 5 is a wiring diagram of the stator of the motor.

Referring in detail to the construction illustrated, 1 designates the usual motor supporting board of a phonograph, said board, as indicated in Fig. 3, being removably supported in the case 2 of the phonograph. The motor, which is designated in its entirety by 3, is designed to operate on single-phase, 110-volt, 25 to 60 cycle alternating current. The stator structure of the motor comprises an annular laminated iron section 4 which is formed with six inwardly extending, equally spaced poles 5, 5. Each pole is slotted as shown in Fig. 5 to form polar extensions $5^a$, $5^b$. The poles carry split-phase windings comprising a series of fine wire coils 6, 6 which are mounted on the pole extensions $5^b$ and connected in series with each other across the line or source, which is represented by the conductors 7, 8. The windings also comprise a series of coarse wire coils 9, 9 which surround the poles 5 and the fine wire coils 6 thereof and are connected in series across the line in the same manner as the fine wire windings. The poles 5 and the coils 6, 9 are such as to permit the latter to be completely formed before being placed upon the poles. Thus the coils 6 and 9 can be mounted on the poles and removed therefrom independently of each other. In the motor illustrated, with a rotor approximately four inches in diameter and laminated iron sections one inch thick, measured axially, each of the fine wire coils 6 has 320 turns of No. 35 copper wire, making the total length of the fine wire windings for the six poles approximately 540 feet. Each of the coarse wire coils 9 has 750 turns of No. 26 copper wire, making the total length of the coarse wire windings for the six coils approximately 3060 feet. With the coils thus wound the current flowing in the coarse wire coils is displaced in phase relative to that flowing in the fine wire coils in the well-known manner, the relatively large inductance of the coarse wire coils causing the current therein to lag relative to the impressed voltage more than the current in the fine wire coils.

It is to be observed that the split-phase effect thus secured is quite different from the split-phase effect secured by so-called shaded pole windings. In my motor, as designed, the fine wire phase-splitting coil has its axis parallel to and is connected so as to act in the same sense with the main pole or coarse wire coil, and, the magneto-motive force induced by the fine wire coil, being partially out of phase with the main magneto-motive force or flux, causes a flux movement in the direction of rotation, but since it is connected so that the current traverses it in the same sense as in the main pole coil, the current or magneto-motive force component of the fine wire coil not out of phase with the main winding magneto-motive force is both in phase and assisting it, instead of opposing it as is the case with some types of shaded pole motors. Consequently my improved stator winding secures a minimum total current consumption and a maximum torque.

Figure 1:
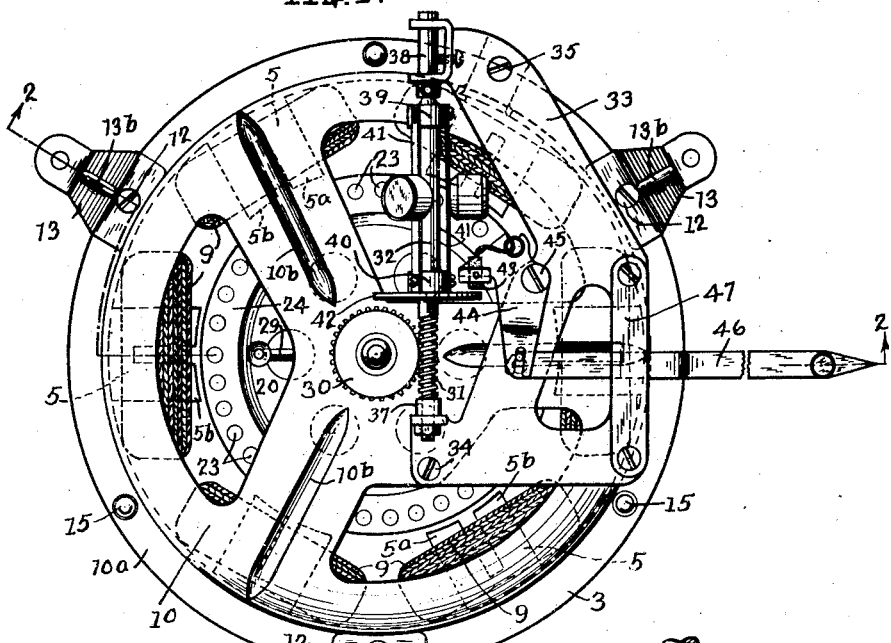

To the upper and lower sides of the annular laminated iron section of the stator are secured the bearing support and casing members 10 and 11. These members are preferably pressed from sheet steel of suitable weight, being given a dished formation with peripheral flanges 10a and 11a which are perforated to receive bolts 12, 12 that serve both to secure the members 10 and 11 to the laminated iron structure of the stator and to clamp the laminæ together. These bolts also serve to secure the supporting brackets 13, 13 to the outer part of the stator structure. The supporting brackets 13 which are also preferably stamped from sheet steel, are secured at their upper ends by screws 14 to the motor supporting board 1. For securing the laminæ of the stator structure 4 together, the bolts 12 are supplemented by a series of rivets 15, the heads of which are accommodated by apertures in the flanges 10a and 11a. The horizontal parts of the members 10 and 11 are formed with openings as shown in Fig. 1 to afford free ventilation for the motor. To render the members 10 and 11 and the supporting brackets 13 amply stiff they are formed with struck-up ribs 10b, 11b and 13b, respectively.

The casing members 10 and 11 are formed with central apertures to receive a bearing sleeve 16 and a bearing socket 17, respectively, the sleeve 16 being secured to the member 10 by screws 18 and the bearing 17 being secured to the member 11 by screws 19.

The rotor of the motor, designated in its entirety by the numeral 20 consists of a shaft 21 and a laminated cylindrical iron body 22 preferably slotted to receive conductor rods 23 which, in the motor shown, are formed of No. 6 copper wire. The conductors 23 are shown short-circuited on themselves by connection with brass or copper rings 24 which are formed with apertures to receive the ends of conductors 23 and said ends are riveted down and soldered to provide close contact and secure the parts of the structure rigidly together. I prefer to dispose the conductors 23 in skew or spiral relation to the rotor axis, rather than parallel to it, and to accomplish this I make the conductor slots in the iron laminæ and the slots in the end rings 24 large enough to permit a twisting or skewing of the laminæ and rings with the conductors therein. Then the conductor ends are riveted down and soldered and the resulting structure is forced upon the rotor shaft. Preferably the shaft section that receives the laminæ is slightly fluted to insure a rigid driving connection between the laminæ and the shaft.

Referring further to the bearing supports of the rotor, the lower end of the shaft 21 is countersunk to receive a hardened steel thrust ball 25 which in turn rests upon a hardened steel plate 26 in the bottom of the bearing socket 17. The upper end of the bearing socket 17 is formed with an annular depression 17a surrounding the shaft 21 and this depression communicates through a duct 17b drilled through the sleeve with the bottom of the bearing chamber therein.

The rotor carries on its upper side a pressed metal cup 27 which surrounds the shaft and the lower part of the bearing sleeve 16. The cup 27 is preferably secured to the shaft 21 by being forced thereon with a tight fit. The sleeve 16 is formed at its upper end with an annular depression 16a surrounding the shaft 21. A duct 16b extending lengthwise through the sleeve 16 places the depression 16a in communication with the cup 27. The sleeve 16 is also formed with an inclined duct 16c leading from the depression 16a to the inner surface of the sleeve between the ends thereof. At its lower end this duct 16c communicates with the upper end of a duct 21a which leads downward through the shaft 21 to the lower end thereof. In this duct 21a I place a plug 28 of felt or other fibrous material. A tube 29 with flaring upturned end is secured to the sleeve 16 in communication with the duct 16c.

When the motor is placed in position the cup 27 is filled or partially filled with oil and the turning of the rotor draws the oil upward between the shaft 21 and the sleeve 16 to the recess or depression 16a whence some of the surplus oil returns through the duct 16b to the cup 27 while some flows through the ducts 16c and 21a to the bottom of the bearing cup 17. Oil rising from the bottom of said cup between its walls and the shaft 21 flows into the depression 17a whence the surplus can drain back to the bottom of the cup. The felt 28 in the duct 21a renders the latter in effect a capillary passage and this prevents an excess of oil flowing to the bottom bearing and flooding it. After use of the motor for a considerable period oil can be introduced through the pipe 29 to replenish the supply.

The speed of the motor is controlled by a centrifugal ball governor brake of the usual type. Above the bearing sleeve 16 and fast on the shaft 21 is a worm wheel 30 with teeth adapted to drive a worm 31 formed on the spindle 32 of the centrifugal governor. The spindle 32 is carried by a supporting frame 33 which is secured by screws 34, 35 to the motor casing section 10, the said section 10 being formed with an integral struck-up bracket 10b to support the end of the frame 33 that is secured by the screw 35. The spindle 32 has the usual coned ends which engage adjustable bearing sockets 37, 38 carried by the frame 33. A sleeve 39 is fixedly secured on one end of the spindle 32 while a sleeve 40 is slidably secured on said spindle, the two sleeves being connected by the usual weighted spring arms 41. The sleeve 40 carries a friction disc 42 which moves axially with said sleeve against a brake block 43 of suitable fibre, felt, leather, cork or the like, said block being mounted in a bell-crank 44 which in turn is pivotally mounted on a screw 45 carried by frame 33. The position of the bell-crank 44 and consequently of the brake block 43 is adjustable by means of a lever 46 pivotally mounted on the frame 33, and frictionally held in adjusted position by the spring clamp 47. By adjustment of lever 46, the governor is caused to regulate the speed of the motor in the well-known manner, the speed ordinarily being held down to 78 or 80 R. P. M. Obviously, this operating speed is but a minor fraction of the synchronous or free-running speed of the motor and it will be understood that the low induction windings 6 constantly connected across the line are essential to the maintenance of the requisite torque at the low operating speed. In this respect the low induction windings of applicant's stator perform an essentially different function from that of the starting windings of ordinary synchronous induction motors which normally operate at or near their synchronous speeds.

Figure 4:
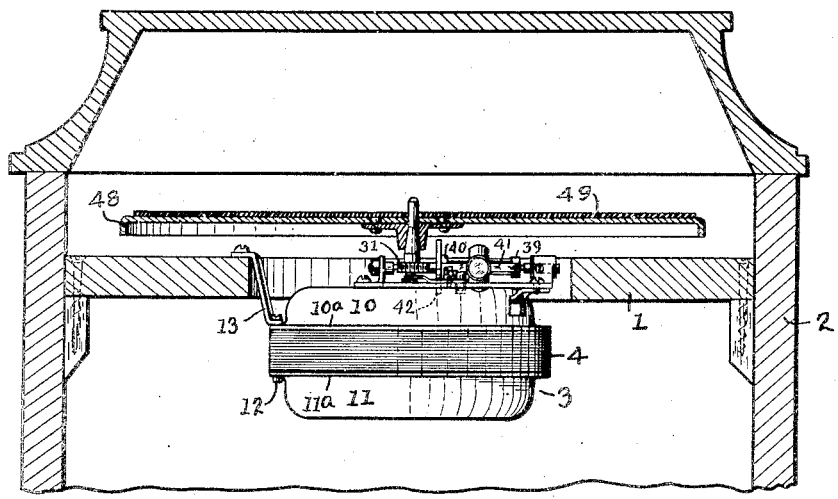
Fig. 4 is a vertical section on a smaller scale of the upper part of a phonograph with my improved motor mounted therein.

As shown in Fig. 4, the upper tapered end of the motor shaft 21 carries the turn-table 48 of the phonograph. 49 represents a disc record supported in the usual manner on the table 48.

In the design of an alternating current motor for phonograph or other similar uses one of the problems involved is the avoidance of so-called alternating current hum set up by vibration of the motor parts. In the above described motor I have accomplished this by making the flux density in the iron sections of the motor very low. Quiet operation, however, is not the only result thus secured for it is largely by reason of the low flux density and correspondingly high impedance of my motor that it can safely be operated at low speeds on 25 cycle alternating currents as well as on 60 cycle currents, the magnetic circuits of the motor being only partially saturated even when operating on 25 cycle current.

In a motor constructed as described the distribution of the field flux around the rotor is symmetrical and the number of poles is sufficient so that a steady and highly uniform torque is secured and the forces on the rotor are balanced. Furthermore, uniform speed is favored by the marked inertia or fly-wheel effect secured by forming a large part of the iron circuit in the rotor structure. Also the torque, even with a motor of very moderate size and weight is ample to insure a highly uniform turntable speed notwithstanding voltage variations ranging as low as 75 volts and as high as 150 volts and regardless of the frequencies of the circuit within the range of 25 to 60 cycles per second. The ample character of the torque of my improved motor is evidenced by its rapid pick-up from rest to 80 R. P. M. in 3 to 4 seconds when operated at normal voltage. Furthermore, as a result of the improved stator windings, a low total current consumption as well as ample torque is attained, with a correspondingly high efficiency for a motor of given size and weight, notwithstanding the low operating speed of the motor.

As the motors above described produce ample torque for phonograph purposes when operated on 110-volt, single-phase current at any frequency ranging from 25 to 60 cycles per second and notwithstanding voltage variation over the wide range above mentioned, they are universally applicable, for phonograph drive, to all single-phase, 110-volt circuits in commercial use.

Since it is possible to completely form both the fine wire and the coarse wire coils before placing them upon the pole sections, a low cost for the windings of the stator is made possible.

It will be observed, furthermore, that the center punchings resulting when the stator laminæ are formed can be used for the rotor laminæ and this favors a low cost for the iron parts.

By making the motor bearing supports or frame sections 10 and 11 in the form of sheet metal stampings I secure for these parts both lightness and low cost as well as ample strength, and the method of attaching these frame members 10 and 11 to the laminated iron stator structure is exceedingly simple and effective and produces a very compact and neat form of construction.

The means provided for lubricating the motor bearings are adapted to maintain adequate lubrication for long periods without attention.

The advantages incident to my improved form of stator winding can be secure, in large measure at least, with other forms of rotor construction. For example, a rotor such as that shown in Fig. 5 may be substituted for the rotor above described. This form of rotor has a cylindrical iron body 50 composed of iron laminæ secured together by rivets 51. The laminated body 50 is non-rotatably mounted on a shaft 52 which in all respects is similar to the shaft 21 of the previously described construction. The secondary conductor carried by the rotor is in the form of a copper band 53 which extends around the periphery of the iron body 50 and is tightly secured thereto by shrinking on. The copper band can be made of a section of seamless copper tubing or, as will readily be understood, can be made of a strip of sheet copper bent around and connected at its ends by a joint forming a good electrical connection. Preferably the band 53 is of a width to extend considerably about the below the laminated body 50.

The construction of this rotor need not be described in further detail since a motor with this type of rotor constitutes the subject of my copending application for phonograph motors, Serial No. 98,903, filed March 31, 1926.

While, as above stated, the advantages incident to my improved stator winding can be secured with the form of rotor last described, all things considered, I prefer to use the squirrel-cage type of rotor first described herein since a motor with this latter type of rotor construction is better adapted to operate over a wide range of frequencies than is the motor with the rotor last described. In the present application I make no claim to the band type of rotor shown in Fig. 5 as it is claimed in my application Serial No. 98,903, above referred to.

In the motor illustrated and above described I present the preferred form of construction but it is to be understood that various modifications can be made without departing from the invention, the scope of the invention being indicated by the appended claims.

What I claim is:

1. In an induction motor, the combination of a rotor comprising secondary current conducting means; an iron stator structure having a pole piece formed with two branches; a split-phase winding comprising a fine wire coil which as an entirety surrounds only one of said branches and a coarse wire coil surrounding both of said branches, said coils being continuously connected in parallel to the same current source while the motor is in operation; and speed regulating means to hold the operating speed of the rotor far below the synchronous or free-running speed of the motor.

2. In an induction motor, the combination of a rotor comprising secondary current conducting means; an iron stator structure having a pole piece formed with two branches; a split-phase winding comprising a fine wire coil which as an entirety surrounds only one of said branches and a coarse wire coil surrounding both of said branches, said coils being continuously connected in parallel to the same current source while the motor is in operation and so placed on the pole piece that their magneto-motive forces are in the same direction; and speed regulating means to hold the operating speed of the rotor far below the synchronous or free-running speed of the motor.

3. In an induction motor, the combination of a rotor comprising a cylindrical laminated iron core and secondary current conducting means disposed around said core adjacent the periphery thereof; an annular laminated iron stator structure formed with a plurality of inwardly extending pole sections disposed symmetrically around the rotor with their polar faces adjacent the peripheral surface thereof, each of said pole sections being divided radially into two branches; a winding on each of said pole sections comprising a fine wire coil which as an entirety surrounds only one of the said pole branches and a coarse wire coil surrounding both of said branches, said fine and coarse wire coils being continuously connected in parallel to the same current source while the motor is in operation and so placed on the pole sections that their magneto-motive forces are in the same direction; and speed regulating means to hold the operating speed of the rotor far below the synchronous or free-running speed of the motor.

4. In an induction motor, the combination of a squirrel-cage rotor; an annular laminated iron stator structure formed with a plurality of inwardly extending pole sections disposed symmetrically around the rotor with their polar faces adjacent the periphery thereof, each of said pole sections being divided radially into two branches; a split-phase winding on each of said pole sections comprising a fine wire coil which as an entirety surrounds only one of the said pole branches and a coarse wire coil surrounding both of said branches, said fine and coarse wire coils being continuously connected in parallel to the same current source while the motor is in operation; and speed regulating means to hold the operating speed of the rotor far below the synchronous or free-running speed of the motor.

In testimony whereof, I hereunto affix my signature.

HARRY P. DORN.